(12) United States Patent
Battisha et al.

(10) Patent No.: US 8,392,889 B2
(45) Date of Patent: Mar. 5, 2013

(54) METHODS, SYSTEMS, AND COMPUTER PROGRAM PRODUCTS FOR REAL TIME CONFIGURATION AND ANALYSIS OF NETWORK BASED ALGORITHMIC SERVICE OBJECTIVES

(75) Inventors: Mohamed Battisha, Plantation, FL (US); Salah Serghini, Sunrise, FL (US); Guoqiang Liu, Miramar, FL (US); Hanafy Meleis, Weston, FL (US); Sameh Yamany, Plano, TX (US); Ayman Eldeib, Sunrise, FL (US)

(73) Assignee: Trendium, Inc., Fort Lauderdale, FL (US)

( * ) Notice: Subject to any disclaimer, the term of this patent is extended or adjusted under 35 U.S.C. 154(b) by 1538 days.

(21) Appl. No.: 11/874,698

(22) Filed: Oct. 18, 2007

(65) Prior Publication Data

US 2009/0106738 A1 Apr. 23, 2009

(51) Int. Cl.
*G06F 9/44* (2006.01)
(52) U.S. Cl. ............ 717/127; 702/182; 702/186; 726/25
(58) Field of Classification Search .................. 717/127; 702/182, 186; 726/25
See application file for complete search history.

(56) References Cited

U.S. PATENT DOCUMENTS

| | | | | |
|---|---|---|---|---|
| 6,055,493 A | * | 4/2000 | Ries et al. | 702/186 |
| 6,061,724 A | * | 5/2000 | Ries et al. | 709/224 |
| 7,194,769 B2 | * | 3/2007 | Lippmann et al. | 726/25 |
| 7,366,160 B2 | * | 4/2008 | Marilly et al. | 370/352 |
| 7,555,408 B2 | * | 6/2009 | Berthaud et al. | 702/184 |

OTHER PUBLICATIONS

Ikeda et al., "Evaluation of a Network Extraction Topology Algorithm for Reducing Search Space of a GA-based Routing Approach", 2006.*
Friedrich et al., "An Integrated Planning and Information System for Transit Network Management", 2000.*

* cited by examiner

*Primary Examiner* — Phillip H Nguyen
(74) *Attorney, Agent, or Firm* — Myers Bigel Sibley & Sajovec, P.A (57) ABSTRACT

A network based algorithmic Service Objective (SO) is evaluated by defining an SO script comprising a plurality of Service Indicators (SIs), each of the SIs comprising an equation including a plurality of operands and at least one operator, instantiating the SO script into an object-oriented representation of the SO, obtaining values for each of the plurality of operands, and computing each of the SI equations using the obtained values.

16 Claims, 6 Drawing Sheets

METHODS, SYSTEMS, AND COMPUTER PROGRAM PRODUCTS FOR REAL TIME CONFIGURATION AND ANALYSIS OF NETWORK BASED ALGORITHMIC SERVICE OBJECTIVES

FIELD OF THE INVENTION

The present invention relates to communication networks and methods of operating the same, and, more particularly, to methods, systems, and computer program products for modeling a Service Objective (SO).

BACKGROUND OF THE INVENTION

The current shift from the relatively static access based service model to the roughly dynamic application based service model has introduced a major challenge in the service provider business. As such, the definition of a new Service Objective (SO) and/or the modification of an existing SO has become a regular activity in many service provider environments. This may constitute a major challenge for a service management platform to assure real time adaptation to such dynamic changes. Another challenge has arisen from the nature of the SO. Conventionally, an SO can be statically defined, represented, and implemented as a simple mathematical equation. The introduction of new service models has caused SOs to become more algorithmic in nature, which typically involves both mathematical and statistical analysis of different types of collection and/or configuration parameters.

SUMMARY

In accordance with some embodiments of the present invention, a network based algorithmic Service Objective (SO) is evaluated by defining an SO script comprising a plurality of Service Indicators (SIs), each of the SIs comprising an equation including a plurality of operands and at least one operator, instantiating the SO script into an object-oriented representation of the SO, obtaining values for each of the plurality of operands, and computing each of the SI equations using the obtained values.

In other embodiments, the equation is encoded in postfix notation.

In still other embodiments, the operands comprise a plurality of operand types, the plurality of operand types comprising a collection parameter type, a constant value type, a configuration parameter type, and/or an SI type corresponding to computed values for other SIs.

In still other embodiments, the equation comprises at least one autonomous operation, and instantiating the SO script comprises modeling each SI as a tree comprising a plurality of leaves associated with at least one analysis node, wherein the plurality of operands are modeled as the plurality of leaves and the at least one autonomous operation is modeled as the at least one analysis node.

In still other embodiments, instantiating the SO script further comprises performing the following for each SI: defining a list for each type of the plurality of operands, checking the operand type for each leaf in the tree, appending the checked operand to the list that matches its type, and inserting a field in each leaf's associated analysis node that indicates the operand type of the leaf and the operand's order in its list.

In still other embodiments, instantiating the SO script further comprises performing the following for each SI: defining an analysis node list, performing the following for each of the at least one analysis node in the tree beginning at a lowest level analysis node and ending at a root analysis node: removing the analysis node from the tree, placing the removed analysis node into the analysis node list, and inserting a field into a parent analysis node of the removed analysis node that indicates the order of the removed analysis node in the analysis node list if the removed analysis node has a parent analysis node.

In still other embodiments, wherein instantiating the SO script further comprises merging the lists for each type of the plurality of operands associated with the plurality of SIs, respectively, and merging the analysis node lists associated with the plurality of SIs, respectively, while maintaining the associations between the plurality of analysis nodes and the plurality of operands.

In still other embodiments, wherein merging the lists for each type of the plurality of operands comprises merging the lists for the SI type. Instantiating the SO script further comprises reordering the merged SI list based on dependencies between the SIs while maintaining the associations between each SI in the SI list and its respective root analysis node.

In still other embodiments, merging the lists for each type of the plurality of operands comprises merging the lists for the SI type. Instantiating the SO script further comprises determining if a circular dependency exists between any pair of SIs, and declaring an error if the circular dependency exists.

Although described primarily above with respect to method embodiments of the present invention, it will be understood that the present invention may be embodied as methods, systems, and/or computer program products.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments of the present invention may facilitate the ability of real time configuration and analysis of Service Objectives (SOs). According to some embodiments, a user is provided with a methodology to define and redefine the algorithmic nature of the SO. The user may also be provided with methods to represent, create, update and store dynamic and persistent definitions of an SO. Based on the user-defined formulas, an analysis engine constructs the designated runtime processing intelligence on the fly. Based on the user-defined formulas, the analysis engine carries out the real time analysis of the SO with minimal performance impact.

Figure 1:
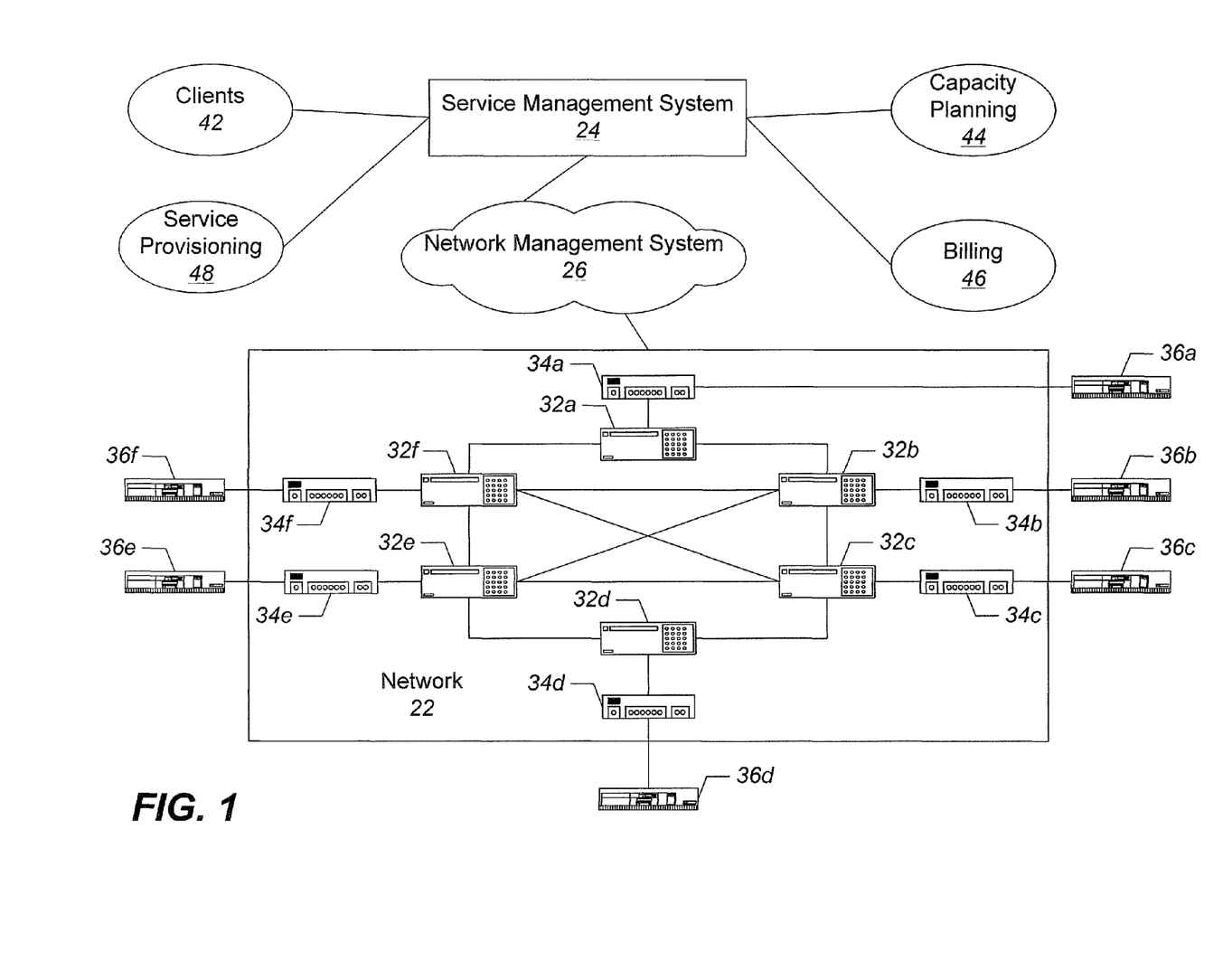
FIG. 1 illustrates a service/network management architecture for a communication network in accordance with some embodiments of the present invention.

Referring now to FIG. 1, an exemplary service/network management system architecture, in accordance with some embodiments of the present invention, includes a network 22, a service management system 24, and a network management system 26 that may be used to interface the service management system 24 to the network 22. It will be understood that the network 22 may be embodied as various network types, in accordance with various embodiments of the present invention, including both wireless and/or wireline networks. The network 22 may include one or more core network elements 32a, 32b, 32c, 32d, 32e, and 32f and one or more access network elements 34a, 34b, 34c, 34d, 34e, and 34f as shown. The access network elements 34a, 34b, 34c, 34d, 34e, and 34f comprise those network elements that are configured at the edge of the network 22 and provide access to the network 22 for access devices from another public or private network. Accordingly, the access network elements 34a, 34b, 34c, 34d, 34e, and 34f may include one or more ports through which a user network interface (UNI) or network interface (NI) may be defined. As illustrated in FIG. 1, each access network element 34a, 34b, 34c, 34d, 34e, and 34f is in communication with a one or more customer access devices 36a, 36b, 36c, 36d, 36e, and 36f over one or more NIs.

The service management system 24 and/or network management system 26 may communicate with the access network elements 34a, 34b, 34c, 34d, 34e, and 34f and/or the core network elements 32a, 32b, 32c, 32d, 32e, and 32f to collect, for example, performance, configuration, topology, timing, and/or traffic data therefrom. The data collected by the service management system 24 and/or network management system 26 are stored in repositories for use by other applications. The repositories may, in some embodiments, be implemented as relational database management systems (RDBMS) that support the structured query language (SQL). It may be desirable to store the collected data in a SQL database to facilitate access of the collected data by other applications. Advantageously, applications may access a SQL database without having to know the proprietary interface of the underlying RDBMS.

Client applications 42 may communicate with the service management system 24 to access reports generated by the service management system 24 based on analyses of the collected data and to manage the services provided by the network 22 (e.g., determine whether the services provided by the network 22 are in conformance with an agreed upon quality of service). Capacity planning applications 44 may communicate with the service management system 24 to assist an administrator in shaping/configuring the topology/shape of the network 22 and/or to distribute traffic carried by the network 22. Billing applications 46 may communicate with the service management system 24 to generate bills based on analyses of the data collected from the network 22. Finally, service provisioning applications 48 may communicate with the service management system 24 to facilitate the introduction of new services into the network 22.

The service management system 24 and/or data processing system(s) supporting the client applications 42, the capacity planning applications 44, the billing applications 46, and the service provisioning applications 48 may be configured with computational, storage, and control program resources for managing service quality, in accordance with some embodiments of the present invention. Thus, the service management system 24 and the data processing system(s) supporting the client applications 42, the capacity planning applications 44, the billing applications 46, and the service provisioning applications 48 may each be implemented as a single processor system, a multi-processor system, or even a network of stand-alone computer systems. In addition, the network management system 26 may be implemented as a single processor system, a multi-processor system, or even a network of stand-alone computer systems.

Although FIG. 1 illustrates an exemplary service/network management system architecture, it will be understood that the present invention is not limited to such a configuration but is intended to encompass any configuration capable of carrying out the operations described herein.

Figure 2:
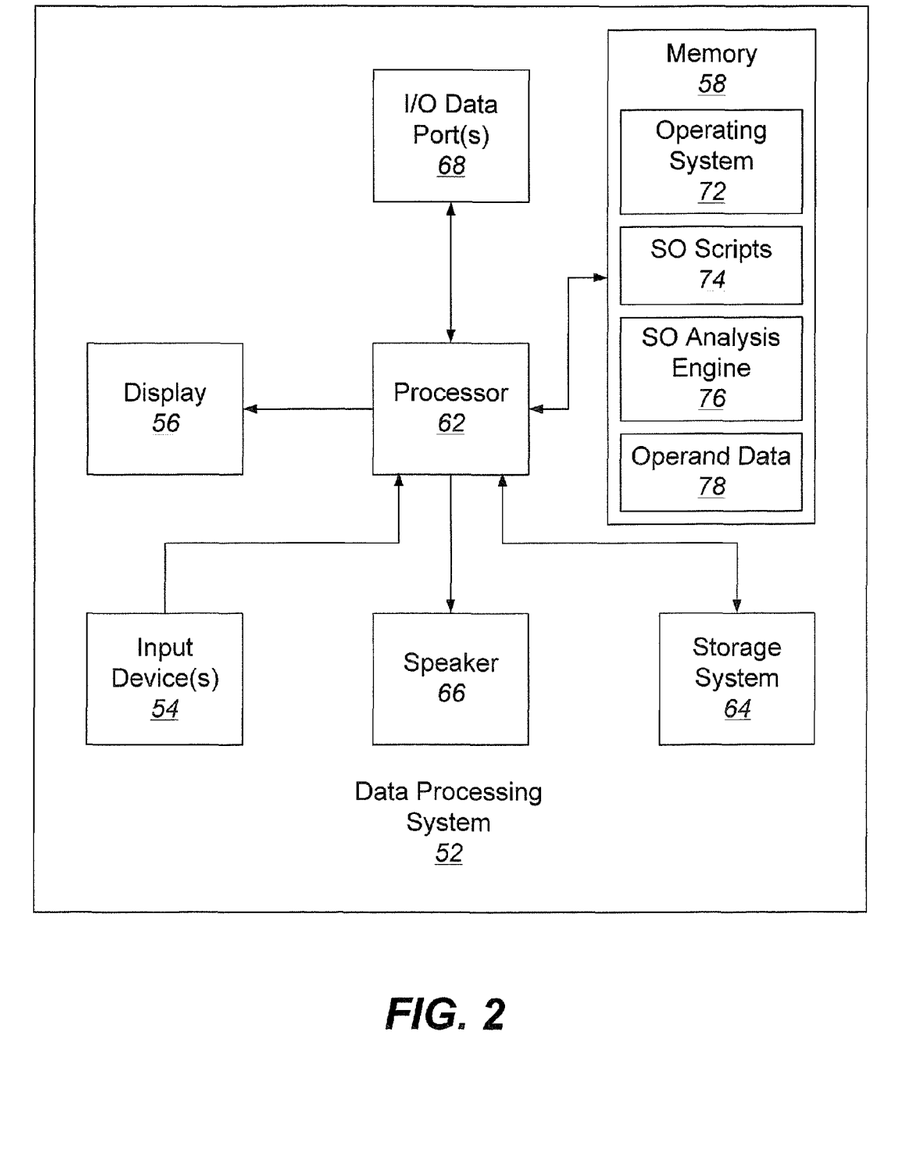
FIG. 2 is a block diagram of a data processing system that can be used to implement service management system of FIG. 1 in accordance with some embodiments of the present invention.

With reference to FIG. 2, the service management system 24 may be embodied as a data processing system 52. Embodiments of the data processing system 52 may include input device(s) 54, such as a keyboard or keypad, a display 56, and a memory 58 that communicate with a processor 62. The data processing system 52 may further include a storage system 64, a speaker 66, and an input/output (I/O) data port(s) 68 that also communicate with the processor 62. The storage system 64 may include removable and/or fixed media, such as floppy disks, ZIP drives, hard disks, or the like, as well as virtual storage, such as a RAMDISK. The I/O data port(s) 68 may be used to transfer information between the data processing system 52 and another computer system or a network (e.g., the Internet). These components may be conventional components, such as those used in many conventional computing devices, which may be configured to operate as described herein.

The processor 62 communicates with the memory 58 via an address/data bus. The processor 62 may be, for example, a commercially available or custom microprocessor. The memory 58 is representative of the overall hierarchy of memory devices containing the software and data used to manage the network in accordance with some embodiments of the present invention. The memory 58 may include, but is not limited to, the following types of devices: cache, ROM, PROM, EPROM, EEPROM, flash, SRAM, and DRAM.

As shown in FIG. 2, the memory 58 may hold four or more major categories of software and data: an operating system 72, SO scripts 74, an SO analysis engine module 76, and operand data 78. The operating system 72 controls the operation of the service management system 24. In particular, the operating system 72 may manage the service management system's resources and may coordinate execution of programs by the processor 62. The operating system 72 may be configured to allow the software modules in the memory 58 to be implemented as an object-oriented system and may facilitate communication between the various software objects. The SO scripts are data structure representations of the SOs. The SO analysis engine 76 may include an SO instantiation algorithm to convert an SO script into an object-oriented representation, which can be realized each time an analysis of the SO is performed. The SO analysis engine 76 may also include an SO realization algorithm to realize an SO in terms of collection and/or configuration parameters. The SO realization algorithm injects the instantiated SO object with real time values of the parameters to perform an analysis of the SO. The operand data 78 represent the collection and/or configuration parameter values along with other data used in modeling an SO.

Computer program code for carrying out operations of the service management system 26 and/or the data processing system 52 discussed above with respect to FIGS. 1 and 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. In some embodiments, the computer program code may include commercially available applications and/or components provided by third parties. It will be further appreciated that the functionality of any or all of the program modules may also be implemented using discrete hardware components, one or more application specific integrated circuits (ASICs), or a programmed digital signal processor or microcontroller.

It will be understood that the SO scripts 74, SO analysis engine 76, and operand data 78 are described herein as being implemented as part of the service management system 24 for purposes of illustration. Embodiments of the present invention are not limited to such an implementation as the SO scripts 74, SO analysis engine 76, and/or operand data 78 may be implemented as part of the network management system 26 or other data processing system that has access to data collected from the network 22 in accordance with various embodiments of the present invention. Moreover, the SO scripts 74, SO analysis engine 76, and/or operand data 78 may be spread across multiple data processing systems in accordance with other embodiments of the present invention.

An SO is defined in terms of a set of service indicators. A service indicator (SI) is configured based on a set of collection and configuration parameters. Each SI may be represented as a mathematical formula encoded in a postfix notation in accordance with some embodiments of the present invention. The postfix notation assures one and only one realization of the SI in terms of its input parameters. To carry out any mathematical equation, the following should be known beforehand:

The operands of the equation.

The operations used in this equation.

The first prerequisite for any mathematical equation to be carried out are the operands of this equation. While realizing the equation, there may be two major concerns about the operands. The first concern is the value of these operands. The second concern is the types of the operand. According to some embodiments of the present invention, an operand can be any one of the following types:

Collection Parameters: the collection parameters are the parameters that can be collected in real time about one or more physical elements, which contribute to the offered service. The collection parameters are the main constituent of the SO formula.

Constant Values. As in any regular equation, some of the operands might be constant. Unlike the collection parameters, the constant values are fixed throughout the lifetime of the SO.

Configuration Parameters: The main difference between the configuration parameters and the collection parameters is the configuration parameters may not change each collection cycle. The configuration parameters can be Service Level Agreement (SLA) parameters that can be considered while calculating the SIs for each SLA. The configuration parameters may also be a configuration attribute of a physical element, which contributes to the service offering.

Service Indicators (SIs): As some of SIs can be driven from other SIs, the instantiated SO may take care of the interdependency between its own SIs. The order of the SIs within the same SO can be used to indicate the nature of the dependency between the SIs (based on the order, one can determine if an SI is dependent on the current or the previous value of another SI). Such a feature may give the SO analysis engine 76 the ability to carry out time based statistical analysis.

Before introducing the concept of the analysis node, consider the way a complex operation is encoded using machine language instructions. Because almost all machine language instructions are binary in nature, any complex operation may be converted to binary operations first. To clarify the previous statement, an example is included below:

Consider the following operation A=(B+C)*D

The following are simple assembly language instructions used to model this operation:

Instruction 1—Add (B, C, T)→this statement adds B, C and store the result in T.

Instruction 2—MUL (T, D, A)→this statement multiplies T, D and stores the result in A.

As can be seen from the example, a complex equation that contains two simple binary operations is converted at the assembly language level into two simple operations (instructions). During the conversion there is a need for a temporary storage to store the intermediate results.

Modeling of a complex operation may go through a number of steps. The number of steps is equal to the number of simple operations within the given complex equation. Each step is an autonomous entity that knows the type of the operations, the two operands, and the place to store the results of the operation. This autonomous entity is referred to as an analysis node in some embodiments of the present invention.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
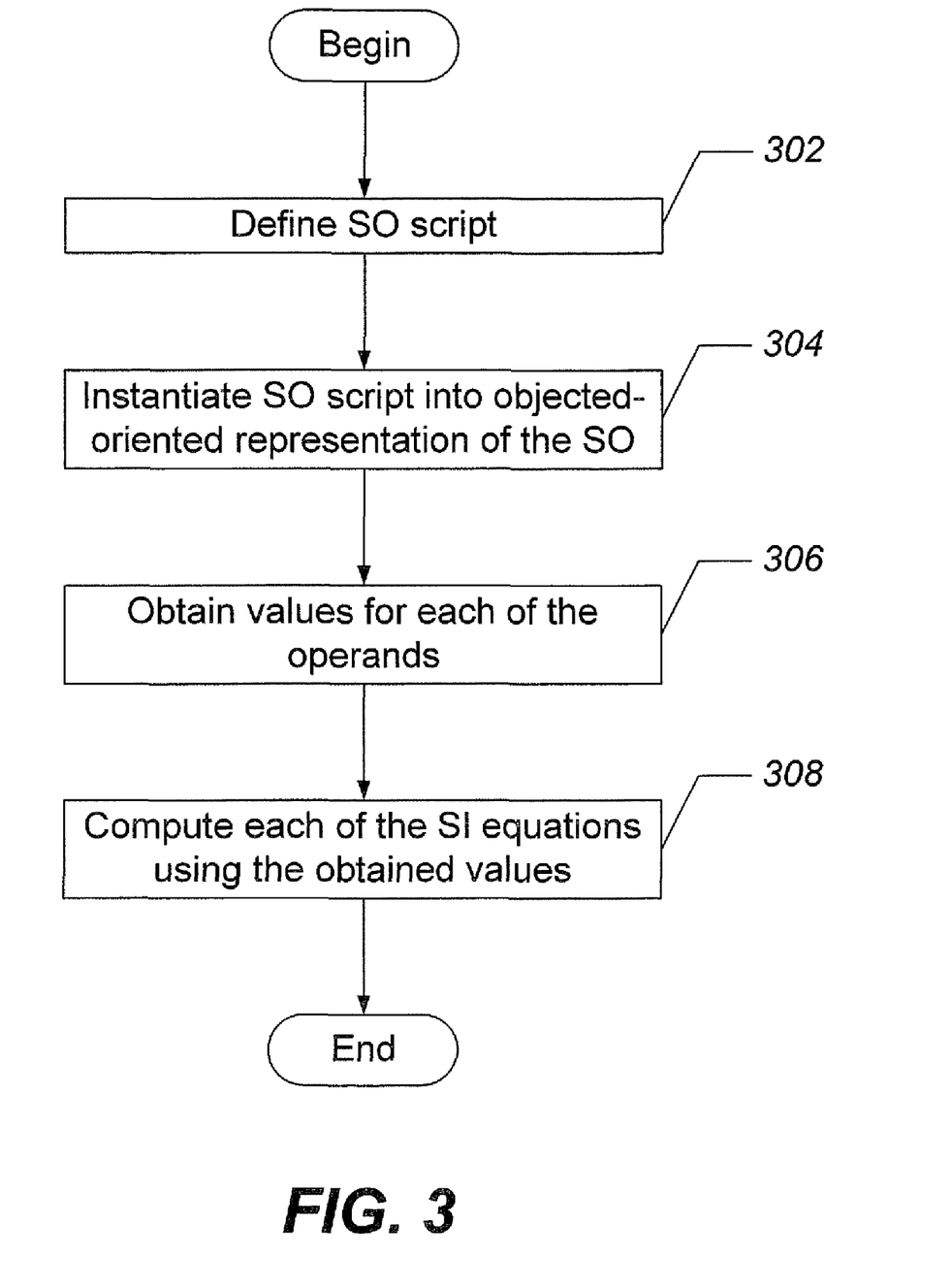
FIGS. 3-6 are flowcharts that illustrate operations for performing a real time configuration and analysis of network based algorithmic Service Objectives (SOs).

Referring to FIG. 3, operations for evaluating a network based algorithmic SO will now be broadly described. Operations begin at block 302 where an SO script is defined. The SO script is converted and instantiated at block 304 into an objected oriented representation of the SO. Values are obtained for each of the operands at block 306 and each of the SI equations are computed at block 308 using the obtained values. Instantiation of the SO object, in accordance with some embodiments of the present invention, is described below.

Because an SO is a set of SIs, instantiating an SO involves instantiating all the SIs within this SO. Once it is instantiated, the SI becomes an object that conducts a certain behavior. The behavior of an SI can be determined from the set of operations carried out within its equation. The attributes of this object are the operands of these operations. The main role of the SI object is to carry out all its associated operations. To do so, the SI object maintains a list of all the analysis nodes that are responsible for carrying out all the intermediate operations. Each analysis node is responsible of executing a simple binary operation. The operands of this binary operation can be a simple operand or the result of another binary operation owned by another analysis node. In this case an SI can be perceived as a root of a binary tree. The leaves of the tree are the simple operands (parameters) used to compute this indicator. The intermediate nodes are analysis nodes or what were described as intermediate steps above. The root node is the final step, which holds the resulting value of the SI. The SO object can be perceived as the set of all of the SIs binary trees.

The SO instantiation algorithm translates the SIs scripts into run time objects that are able to perform the real time analysis. Each SI formula can be represented as a binary tree of operations and operands. Each leaf of the tree represents an operand and each intermediate node represents an intermediate operation (analysis node). Finally each SI will be a root of the binary tree. Based on this, and as discussed below with respect to FIGS. 4-6, the SO instantiation algorithm involves the following three operations in accordance with some embodiments of the present invention:

SI operands classification

SI tree decomposition

SO object model construction

Figure 4:
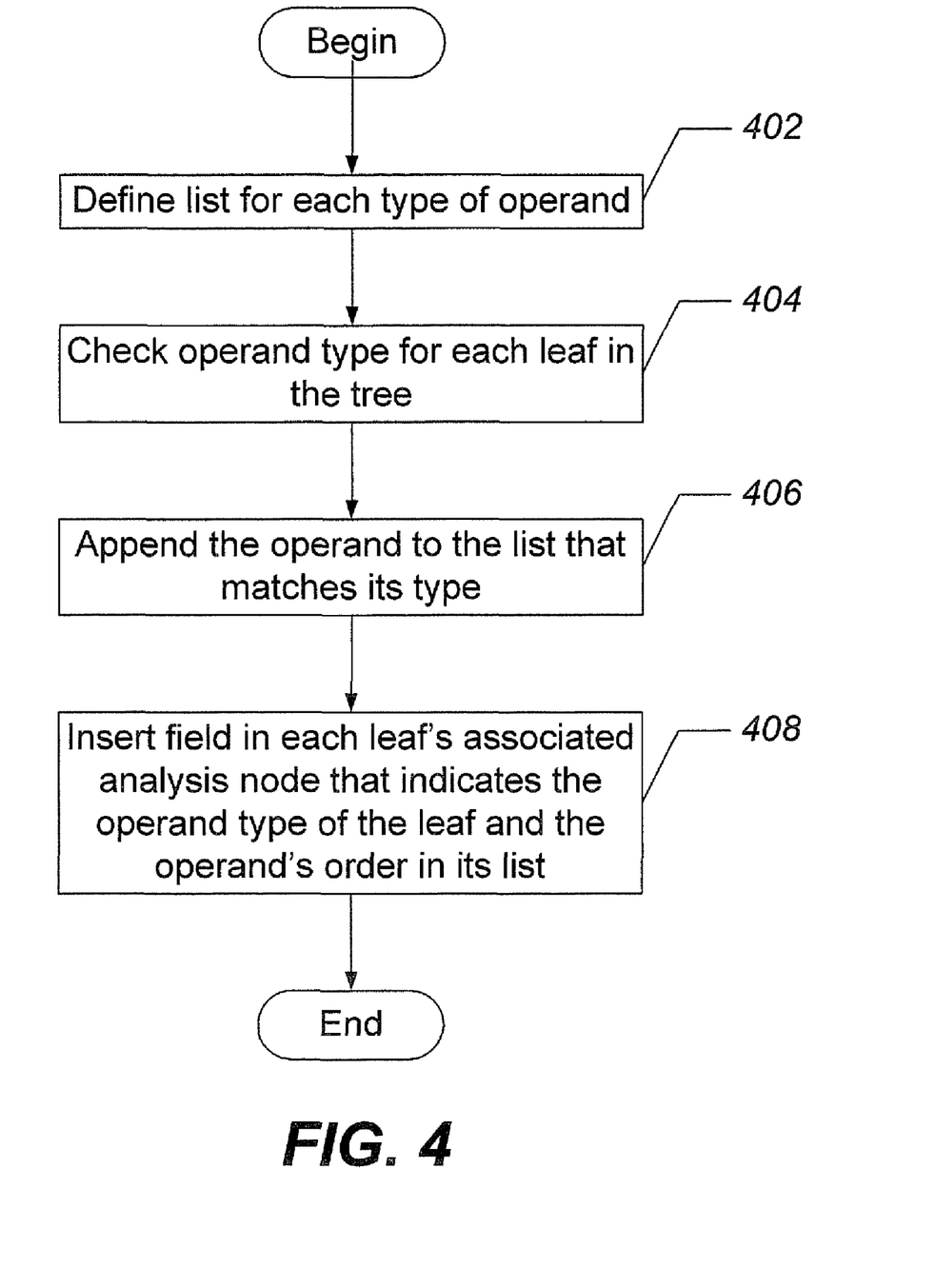

Referring to FIG. 4, operations for SI operand classification, in accordance with some embodiments of the present invention, begin at block 402 where a list is defined for each type of operand. At block 404, the operand type is checked for each leaf in the tree. The operand is appended to the list that matches its type at block 406. At block 408, a field is inserted in each leafs associated analysis node that indicates the operand type of the leaf and the operand's order in its list.

Figure 5:
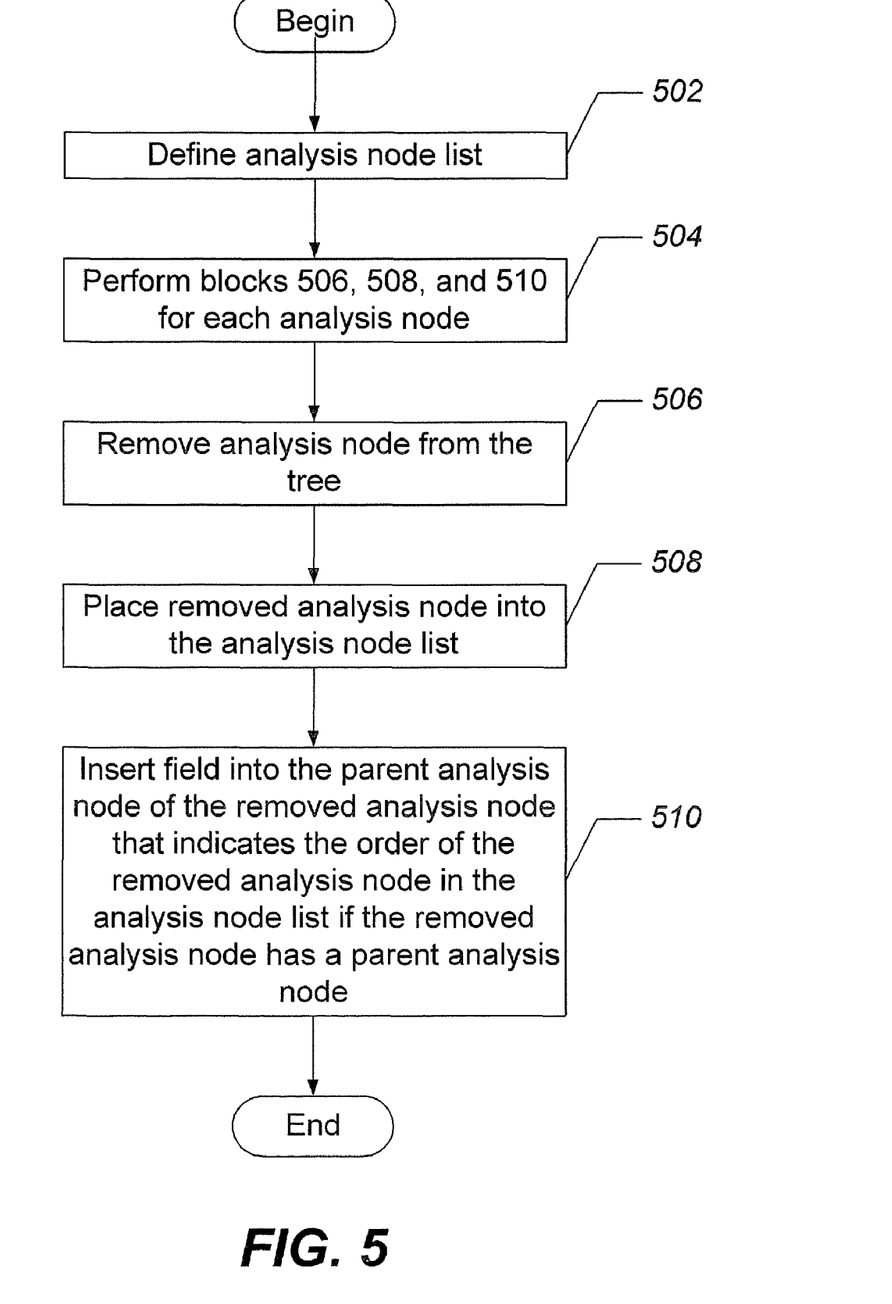

Referring to FIG. 5, operations for SI tree decomposition, in accordance with some embodiments of the present invention, begin at block 502 where an analysis node list is defined. Blocks 506, 508, and 510 are performed for each analysis node as indicated by block 504. At block 506, an analysis node is removed from the tree. The removed analysis node is placed into the analysis node list at block 508. At block 510 a field is inserted into the parent analysis node of the removed analysis node that indicates the order of the removed analysis node in the analysis node list if the removed analysis node has a parent analysis node.

Figure 6:
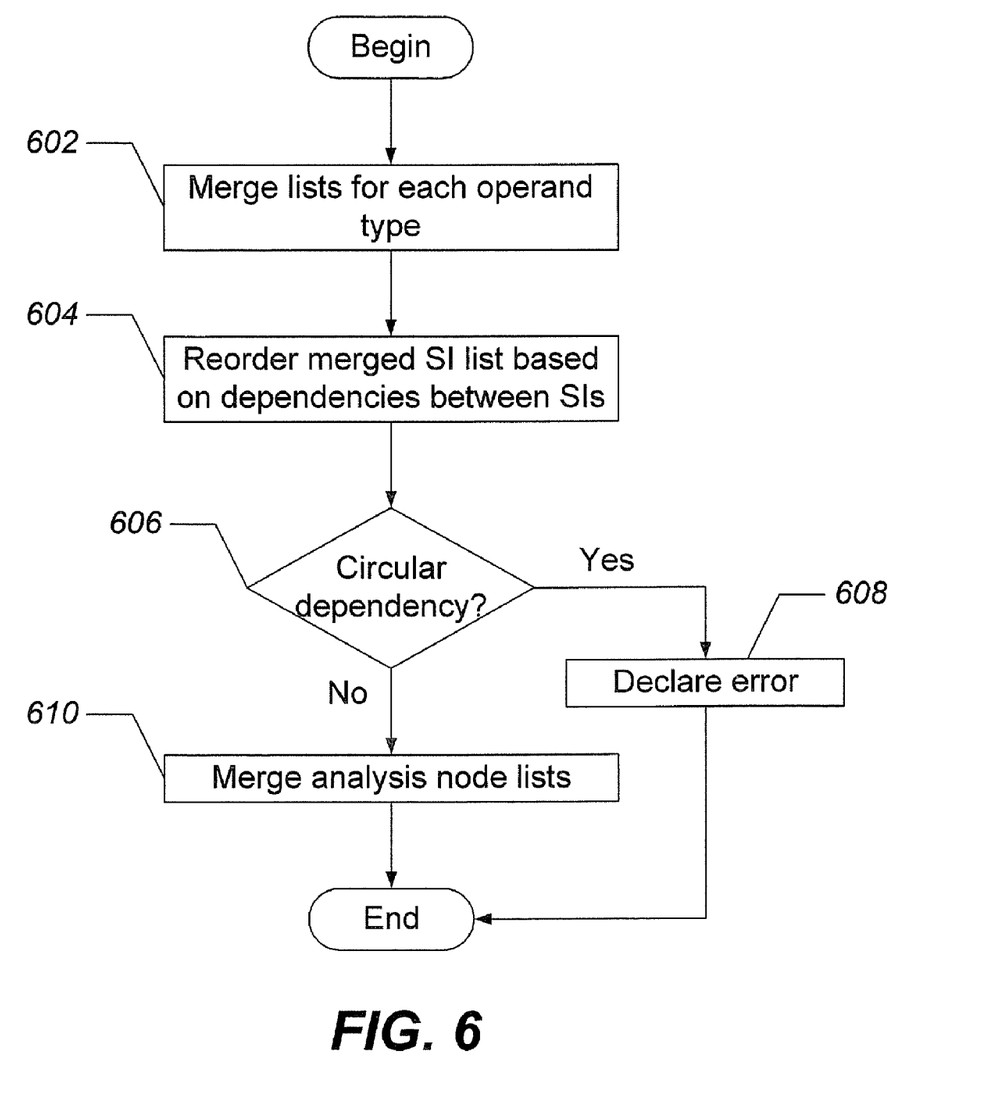

Referring to FIG. 6, operations for constructing the SO object model, in accordance with some embodiments of the present invention, begin at block 602 where the operand type lists for each of the SIs comprising the SO are merged. At block 604, the merged list for the SI operand type is reordered based on dependencies between SI while maintaining the associations between each SI in the SI list and its respective root analysis node. The final object model represents the algorithmic nature of the SO formula in terms of the dependency of its SIs. The following are the two types of dependencies between SIs within the same SO:

Case 1: SI' X' is dependent on the current value of SI 'Y'

Case 2: SI 'X' is dependent on the previous value of SI 'Y'

Thus, SIs in the can be reordered by applying the following rules:

For Case 1 assure SI 'X' is executed after SI 'Y'

For Case 1 assure SI 'X' is executed before SI 'Y'

If there is a circular dependency between a pair of SIs in an SO as determined at block 606, then an error is declared at block

608 and operations terminate. Otherwise, the analysis node lists are merged at block 610 while maintaining the associations between each analysis node in the analysis node list and its operands in other operand lists.

At design time, the analysis node knows only that its behavior can be attached to certain operation. It doesn't know either the type of the operation or the operands of this operation. At run time, during the instantiation of the SO model, the exact operation and the operand types can be confirmed. The real values of the operands are only obtained during the real time analysis. Some embodiments of the present invention may provide an extension to the polymorphic feature of the object orient design model. The polymorphism enables the object-oriented designer to design an abstract class, and then implement all the different behavioral patterns of that class. At run time and according the program path, one of the implemented behavioral patterns will be used. According to some embodiments of the present invention, this feature is extended to enable the construction of the behavioral patterns of the polymorphic object at run time while instantiating the SO object and selecting one of them based on the operand values while performing the real time analysis.

At design time, the SO object only recognizes that the input to its analysis nodes is formed from four different types of operand lists. It knows neither the number of elements in each of these lists nor the number of analysis nodes. At run time, and after the SO object instantiation, the SO object can determine the type of its analysis nodes and hence the number of elements in each operand list.

The SO object can carry out the analysis on its abstract analysis node list, which will be dynamically bound after the SO object instantiation to a specific analysis node list. As such the realization of each SO can be summarized as follows:

Obtain the value of all the input parameters
For each SI in the SI list
Invoke an abstract method to analyze the SI Getting the result of a parent analysis node (SI) forces the children nodes to obtain their results and return their values to their parents. This recursive behavior will continue until reaching the leaves of each tree (the operand list). The value of each SI will then be computed and inserted in the SI list. In some embodiments of the present invention, the dynamically bound method to get the result of each analysis node is implemented as an inline function to eliminate the overhead that take place while calling a function. This may help ensure that the performance of the instantiated run time operation is comparable to the same operation if coded at design time and compiled using a regular complier.

The flowcharts of FIGS. 3-6 show the architecture, functionality, and operation of exemplary implementations of the software modules and data used in some embodiments of the present invention. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 3-6. For example, two blocks shown in succession in FIGS. 3-6 may be executed substantially concurrently or the blocks may sometimes be executed in the reverse order, depending upon the functionality involved.

Many variations and modifications can be made to the embodiments described herein without substantially departing from the principles of the present invention. All such variations and modifications are intended to be included herein within the scope of the present invention, as set forth in the following claims.

That which is claimed:

1. A method of evaluating a network based algorithmic Service Objective (SO), comprising:
    defining an SO script comprising a plurality of Service Indicators (SIs), each of the SIs comprising an equation including a plurality of operands and at least one operator;
    instantiating the SO script into an object-oriented representation of the SO;
    obtaining values for each of the plurality of operands; and
    computing each of the SI equations using the obtained values;
    wherein the equation comprises at least one autonomous operation, and wherein instantiating the SO script comprises:
    modeling each SI as a tree comprising a plurality of leaves associated with at least one analysis node, wherein the plurality of operands are modeled as the plurality of leaves and the at least one autonomous operation is modeled as the at least one analysis node;
    performing the following for each SI:
    defining a list for each type of the plurality of operands;
    checking the operand type for each leaf in the tree;
    appending the checked operand to the list that matches its type; and
    inserting a field in each leaf's associated analysis node that indicates the operand type of the leaf and the operand's order in its list.

2. The method of claim 1, wherein the equation is encoded in postfix notation.

3. The method of claim 1, wherein the operands comprise a plurality of operand types, the plurality of operand types comprising a collection parameter type, a constant value type, a configuration parameter type, and/or an SI type corresponding to computed values for other SIs.

4. The method of claim 1, wherein instantiating the SO script further comprises:
    performing the following for each SI:
    defining an analysis node list;
    performing the following for each of the at least one analysis node in the tree beginning at a lowest level analysis node and ending at a root analysis node:
    removing the analysis node from the tree;
    placing the removed analysis node into the analysis node list; and
    inserting a field into a parent analysis node of the removed analysis node that indicates the order of the removed analysis node in the analysis node list if the removed analysis node has a parent analysis node.

5. The method of claim 4, wherein instantiating the SO script further comprises:
    merging the lists for each type of the plurality of operands associated with the plurality of SIs, respectively; and
    merging the analysis node lists associated with the plurality of SIs, respectively, while maintaining the associations between the plurality of analysis nodes and the plurality of operands.

6. The method of claim 5, wherein merging the lists for each type of the plurality of operands comprises merging the lists for the SI type, and wherein instantiating the SO script further comprises:
    reordering the merged SI list based on dependencies between the SIs while maintaining the associations between each SI in the SI list and its respective root analysis node.

7. The method of claim 5, wherein merging the lists for each type of the plurality of operands comprises merging the lists for the SI type, and wherein instantiating the SO script further comprises:
determining if a circular dependency exists between any pair of SIs; and
declaring an error if the circular dependency exists.

8. A system for evaluating a network based algorithmic Service Objective (SO), comprising:
a processor;
a computer readable medium coupled to the processor;
an SO script stored on the computer readable medium and comprising a plurality of Service Indicators (SIs), each of the SIs comprising an equation including a plurality of operands and at least one operator; and
an SO analysis engine stored on the computer readable medium and that is to instantiate the SO script into an object-oriented representation of the SO and to obtain values for each of the plurality of operands;
wherein the objected-oriented representation of the SO is to compute each of the SI equations using the obtained values;
wherein the equation comprises at least one autonomous operation, and wherein the SO analysis engine is further configured to model each SI as a tree comprising a plurality of leaves associated with at least one analysis node, wherein the plurality of operands are modeled as the plurality of leaves and the at least one autonomous operation is modeled as the at least one analysis node, to define a list for each type of the plurality of operands, to check the operand type for each leaf in the tree, to append the checked operand to the list that matches its type, and to insert a field in each leafs associated analysis node that indicates the operand type of the leaf and the operand's order in its list.

9. The system of claim 8, wherein the equation is encoded in postfix notation.

10. The system of claim 8, wherein the operands comprise a plurality of operand types, the plurality of operand types comprising a collection parameter type, a constant value type, a configuration parameter type, and/or an SI type corresponding to computed values for other SIs.

11. The system of claim 8, wherein the SO analysis engine is further to perform the following for each SI:
define an analysis node list;
perform the following for each of the at least one analysis node in the tree beginning at a lowest level analysis node and ending at a root analysis node:
remove the analysis node from the tree;
place the removed analysis node into the analysis node list; and
insert a field into a parent analysis node of the removed analysis node that indicates the order of the removed analysis node in the analysis node list if the removed analysis node has a parent analysis node.

12. The system of claim 11, wherein the SO analysis engine is further to merge the lists for each type of the plurality of operands associated with the plurality of SIs, respectively, and to merge the analysis node lists associated with the plurality of SIs, respectively, while maintaining the associations between the plurality of analysis nodes and the plurality of operands.

13. The system of claim 12, wherein the SO analysis engine is to merge the lists for the SI type, the SO analysis engine being further configured to reorder the merged SI list based on dependencies between the SIs while maintaining the associations between each SI in the SI list and its respective root analysis node.

14. The system of claim 12, wherein the SO analysis engine is to merge the lists for the SI type, the SO analysis engine is further to determine if a circular dependency exists between any pair of Sis, and to declare an error if the circular dependency exists.

15. A computer program product for evaluating a network based algorithmic Service Objective (SO), comprising:
a non-transitory computer readable storage medium having computer readable program code embodied therein, the computer readable program code comprising:
computer readable program code to define an SO script comprising a plurality of Service Indicators (SIs), each of the SIs comprising an equation including a plurality of operands and at least one operator;
computer readable program code to instantiate the SO script into an object-oriented representation of the SO;
computer readable program code to obtain values for each of the plurality of operands; and
computer readable program code to compute each of the SI equations using the obtained values;
wherein the equation comprises at least one autonomous operation, and wherein the computer readable program code to instantiate the SO script comprises:
computer readable program code to model each SI as a tree comprising a plurality of leaves associated with at least one analysis node, wherein the plurality of operands are modeled as the plurality of leaves and the at least one autonomous operation is modeled as the at least one analysis node;
computer readable program code to perform the following for each SI:
defining a list for each type of the plurality of operands;
checking the operand type for each leaf in the tree;
appending the checked operand to the list that matches its type; and
inserting a field in each leafs associated analysis node that indicates the operand type of the leaf and the operand's order in its list.

16. The computer program product of claim 15, wherein the operands comprise a plurality of operand types, the plurality of operand types comprising a collection parameter type, a constant value type, a configuration parameter type, and/or an SI type corresponding to computed values for other SIs.

* * * * *